United States Patent [19]

De Bin et al.

[11] 4,111,739

[45] Sep. 5, 1978

[54] CORNER TUCKING DEVICE FOR LAMINATED SHEETS

[75] Inventors: René Francois De Bin; William Van der Gucht, both of Aalst, Belgium

[73] Assignee: FMC Corporation, San Jose, Calif.

[21] Appl. No.: 798,528

[22] Filed: May 19, 1977

Related U.S. Application Data

[63] Continuation of Ser. No. 626,160, Oct. 28, 1975, abandoned.

[30] Foreign Application Priority Data

Nov. 12, 1974 [BE] Belgium ................................ 822089

[51] Int. Cl.² ................................................ B32B 3/04

[52] U.S. Cl. ..................................... 156/486; 156/216

[58] Field of Search ............... 156/486, 489, 492, 212, 156/213, 216, 202, 358, 475, 479, 480

[56] References Cited

U.S. PATENT DOCUMENTS

| | | | |
|---|---|---|---|
| Re. 28,654 | 12/1975 | Helmes et al. | 156/212 |
| 3,044,534 | 7/1962 | Yoho | 156/480 |
| 3,475,261 | 10/1969 | Ettore et al. | 156/479 X |
| 3,756,894 | 9/1973 | Shugart | 156/443 |
| 3,840,420 | 10/1974 | Sarcia | 156/583 |
| 3,892,618 | 7/1975 | Griebat | 156/353 |

*Primary Examiner*—William A. Powell
*Assistant Examiner*—William H. Thrower
*Attorney, Agent, or Firm*—C. E. Tripp; L. J. Pizzanelli

[57] ABSTRACT

The disclosed device comprises a roller, rotatably mounted on a pivotable arm, for maintaining rolling contact with the edges of sheets being adhesively laminated. One of the sheets is rather stiff board and the other a thin gauge sheet covering one side of the board. As the laminated sheets advance the roller, which is in pressure engagement with the edges of the board parallel to the direction of movement, moves laterally inwardly to also provide rolling contact with the lateral trailing edge of the board. In doing so the corners of the thin wrap are pressed tightly against the edges of the board to produce well defined corners.

3 Claims, 9 Drawing Figures

FIG_5
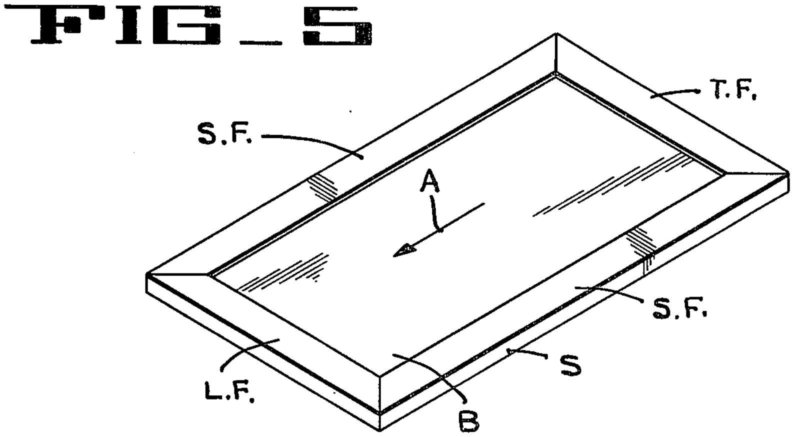
FIG_6
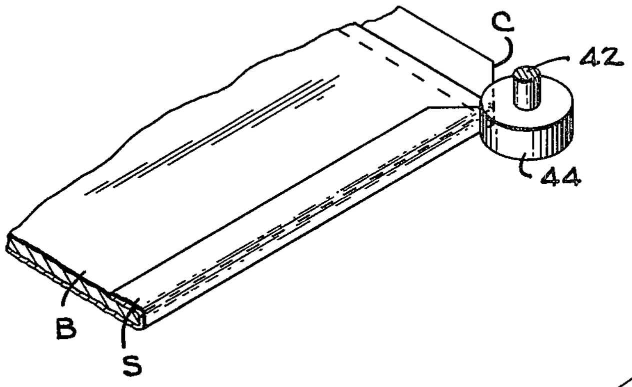
FIG_7
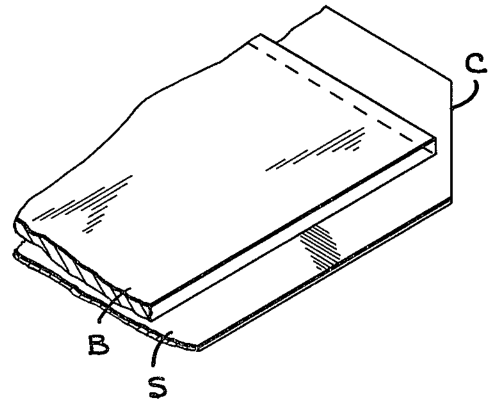
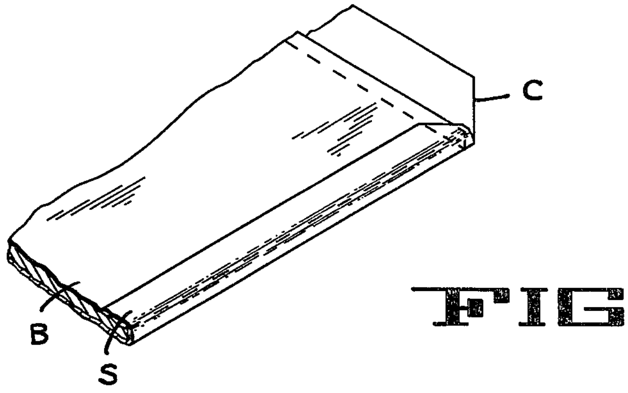
FIG_8

CORNER TUCKING DEVICE FOR LAMINATED SHEETS

This is a continuation of application Ser. No. 626,160 filed Oct. 28, 1975, now abandoned.

BACKGROUND OF THE INVENTION

The device disclosed in the present application forms part of a wrapper which is designed to wrap light paper such as on record jackets and game boards and also heavy stock on book covers and artist panels. Briefly, and in general, sheets of thin paper which may include any desired artwork, are individually fed through a gluing mechanism which applies and even coat of glue to one side of the sheet. After being glued, the sheet is transported to a spotting device which supports an individual sheet of heavy board over the glued wrap. Onee the spotting device has located the edges of the sheet or wrap (conventionally this is done by use of photocells which "read" the edges of the wrap) the board is spotted onto the glued wrap. The conveyor, supporting the combined wrap and board, transports the laminated sheets to a wrapper which includes a series of devices for sequentially folding the edges of the sheet around and onto the upper surface of the board.

A machine for sequentially wrapping or turning a thin sheet of paper around the edges of a flat board is made by Crathern Engineering Company, located at Maple Street, Contoocook, N.H., U.S.A. The wrapper manufactured by Crathern Engineering Company is sold in selected geographical areas of the world by the assignee of the present invention.

The covering sheet or wrap for a rectangular rigid board is cut so that corresponding dimensions are great enough to cover the edges and be adhesively attached to the opposite side of the board. Depending on the thickness of the board, it is usual to cut the wrap so that it extends about 1 centimeter ($\frac{3}{8}$ to $\frac{1}{2}$ inch) inwardly from the edges of the board when it is adhesively attached thereto. The most difficult and the most important requirement is that the wrap be in firm contact with the corners of the board to thereby create a well defined board-wrap laminate. To fulfill such a requirement the corners of the wrap are cut at 45°. When folded around the board edges and attached to the opposite side of the board, the intersection of the wrap edges define a mitered joint.

Achieving an acceptable corner appearance is the result of performing several things properly. Of primary importance is that the board be properly positioned on the glued wrap by the spotter. Failure to do so is usually apparent from the configuration of the corners which either fold in a way creating small wrap projections or a gap exists at the corner revealing an uncovered board edge.

Apparatus is presently incorporated in the wrapper for pressing the wrap along the opposed longitudinal edges of the board and, as the trailing or rear edge of the board passes the pressing device, the rear edge is also contacted in order to tuck the sheet against the rear edge. The presently used device has been found to be erratic in operation which is believed to be a result of its design which comprises a small diameter disc rotating about a vertical shaft. The disc mounts a series of circumferentially spaced pins which are parallel to the axis of rotation of the disc. When in engagement with the moving longitudinal edge of the laminated board two adjacent pins make contact therewith. As the trailing edge of the board passes by the pins, the disc is slightly indexed because when the trailing edge of the board passes the first pin, indexing of the disc occurs causing one of the pins to make pressure contact with the trailing edge of the board. Use of this device has been erratic due to the fact that the required stepwise rotation of the disc oftentimes does not occur.

SUMMARY OF THE INVENTION

According to the improved wrap tucking device of the present invention, a pair of laterally spaced rollers, rotating about a vertical axis, are provided for establishing pressure engagement with the opposed longitudinal edges and the trailing edge of the laminated sheets. The preferred construction shown by the attached drawings comprises a pivotable lever rotatably mounting the tucking roller and being operated to bring the roller in contact with the sheet edge in response to the presence of a sheet adjacent the roller. To locate the roller in an inactive or inoperative position, a linear actuator operating a cable attached to the lever, is provided. The actuator is operated to release tension on the cable so that the lever may be pivoted by the action of a tension spring which provides the desired degree of pressure engagement of the roller and the laminated sheets. When the trailing edge of the sheet has been detected, and this is accomplished by use of a limit switch, the actuator is operated to pivot the lever against the bias of the spring.

According to the above construction it has been found that the pivoting roller maintains pressure engagement with the edges of the laminated sheets as the roller traverses the side and rear edges of such sheets. Therefore, the results achieved demonstrate that a well defined folded corner is produced.

BRIEF DESCRIPTION OF THE DRAWINGS

FIG. 5 is a perspective showing the wrap and the board after wrapping has occurred, FIG. 6 is a fragmentary perspective illustrating the longer flap of the wrap applied to the board and the relationship of the tucking roller as it arrives at the intersection of the rear edge and the longitudinal edge, FIG. 7 is also a fragmentary perspective showing one condition, which frequently occurs, wherein the board is applied to the wrap slightly out of register, and, FIG. 8 shows the manner in which the corner of the wrap, when a condition of improper registration occurs, is tucked around and against the rear edge of the board by the tucking device of the present invention.

DESCRIPTION OF THE PREFERRED EMBODIMENT

Figure 1:
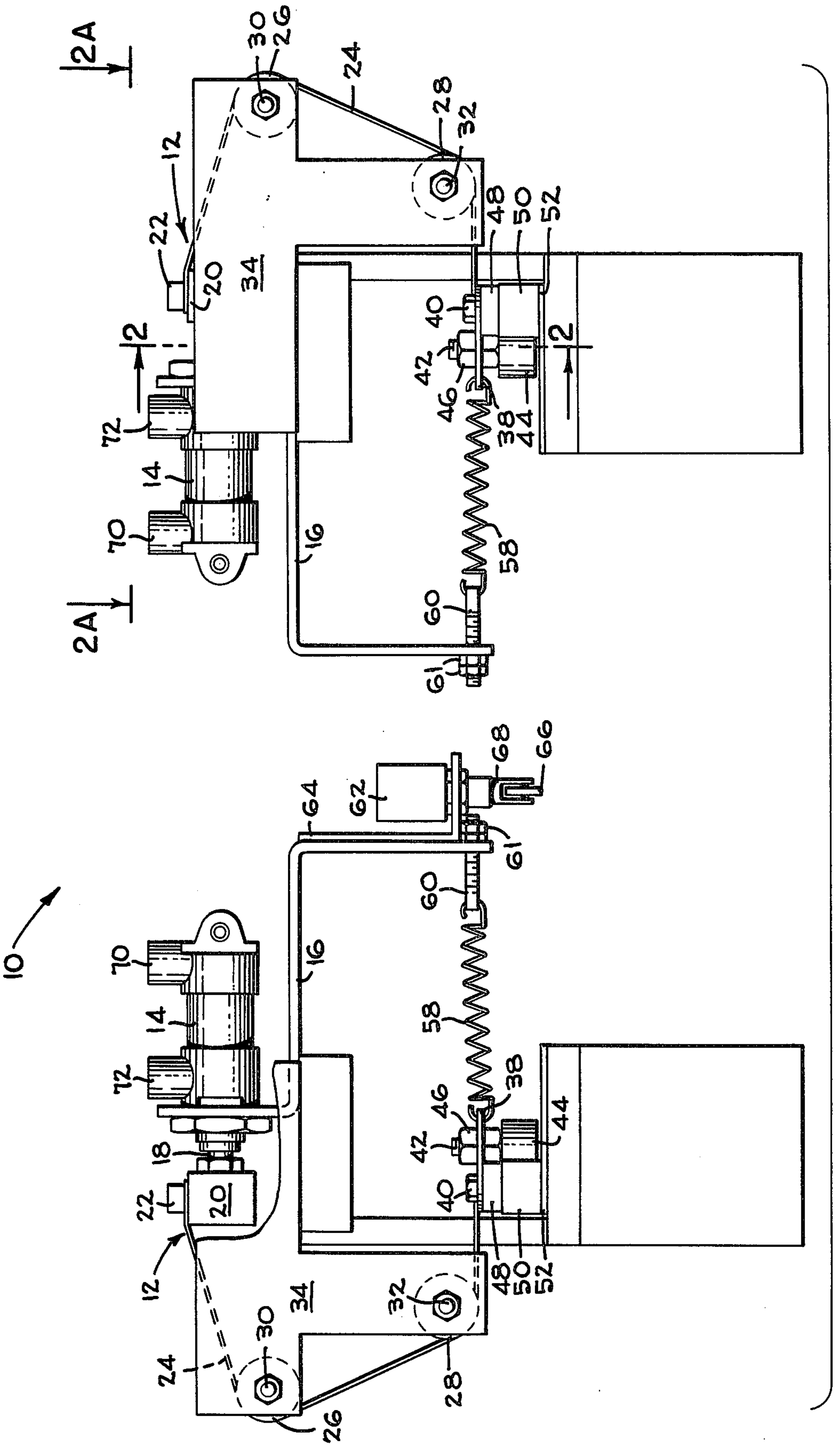
FIG. 1 is a front elevation showing laterally opposed tucking devices between which the laminated sheets are passed.
Figure 4:
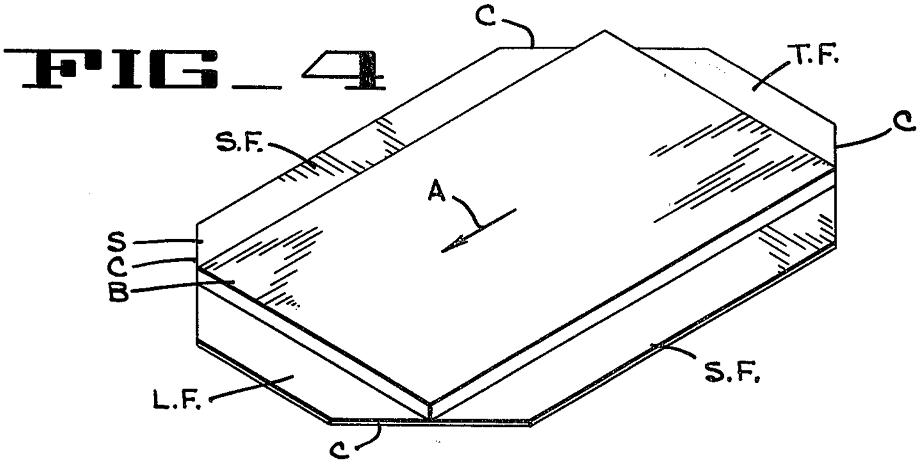
FIG. 4 is a perspective showing the board combined with the sheet or wrap before turning of the wrap edges takes place.

The general arrangement of the novel tucking device of the present invention is shown in FIG. 1 and it is generally identified by the numeral 10. It is to be recalled that the tucking device of the present invention serves the primary purpose of tightly folding the wrap around the rear corners and against the rear edge of the board. The mentioned model 4 FW flap board wrapper made by and marketed under the name of Crathern is designed to sequentially fold the leading side and trailing flaps of the wrap onto the board. With reference to FIG. 4, which shows the combined sheets and the assumed direction of feed indicated by the arrow A, it will be seen that a board B is laminated to an underlaying sheet S having flaps identified, respectively, as a leading flap L.F., side flaps S.F. and a trailing flap T.F. The corners of the sheet, sometimes hereinafter referred to as the wrap, has its corners C cut to establish an edge which is located at approximately 45° with the edges of the board. Reference to FIG. 5 will show the wrap S completely applied to the board and it should be noted that the corners, in a properly wrapped board, conform to that of the board without the existence of slight projections resulting from either improper registration or tucking of the corners. Since the tucking device includes opposed mechanisms of similar construction the following explanation will relate to the one shown on the right as viewed in FIG. 1.

Referring now to FIG. 1, the arrangement of the novel tucking device of the present invention will now be described. The tucking device 10 comprises means, collectively identified by the numeral 12, for positioning the tucking roller to an operative or inoperative position in response to the presence or absence of a combined sheet and board at the tucking station. The condition of the combined sheet and board when they arrive at the tucking device 10 is such that the leading flap and the side flaps, respectively, LF and SF have been folded and attached to the back side of the board as shown in FIG. 5. The trailing flap T.F. is still in its extended position as shown in FIG. 4.

Figure 2:
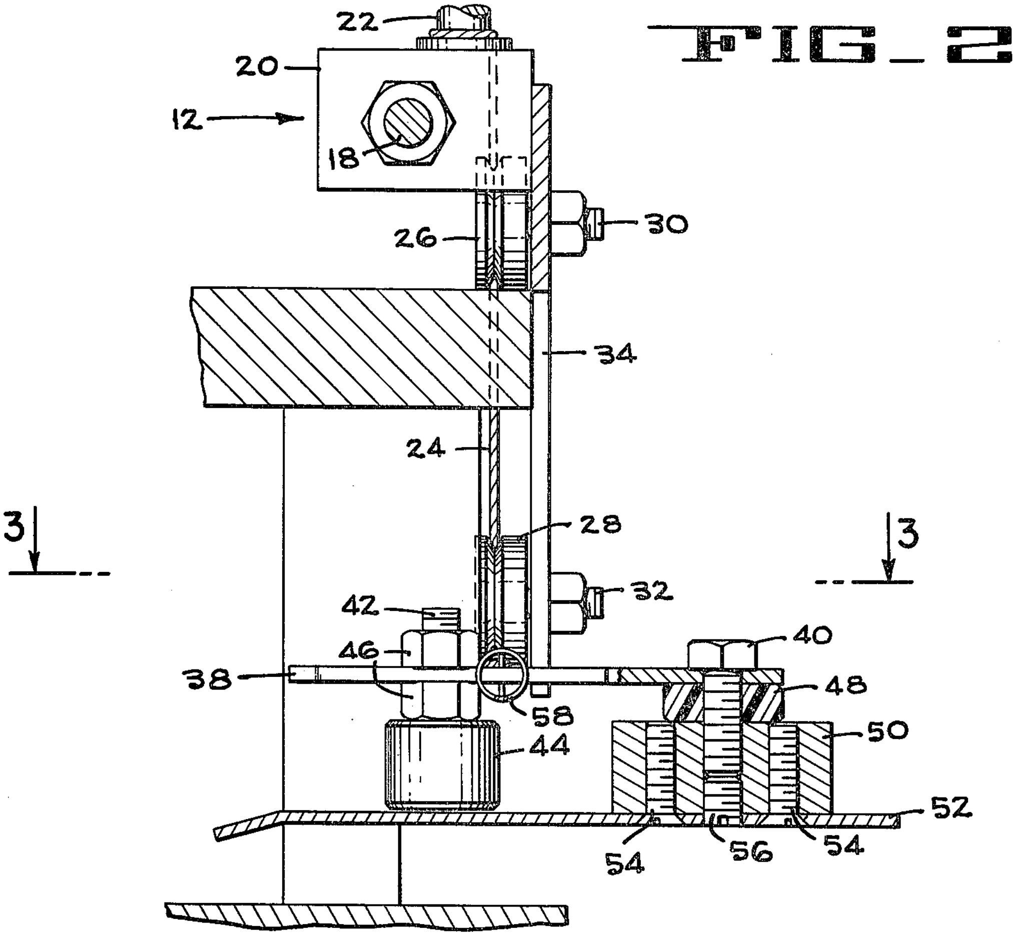
FIG. 2 is a section, taken substantially along the line 2—2 of FIG. 1, showing the manner in which the tucking roller is mounted.
Figure 2A:
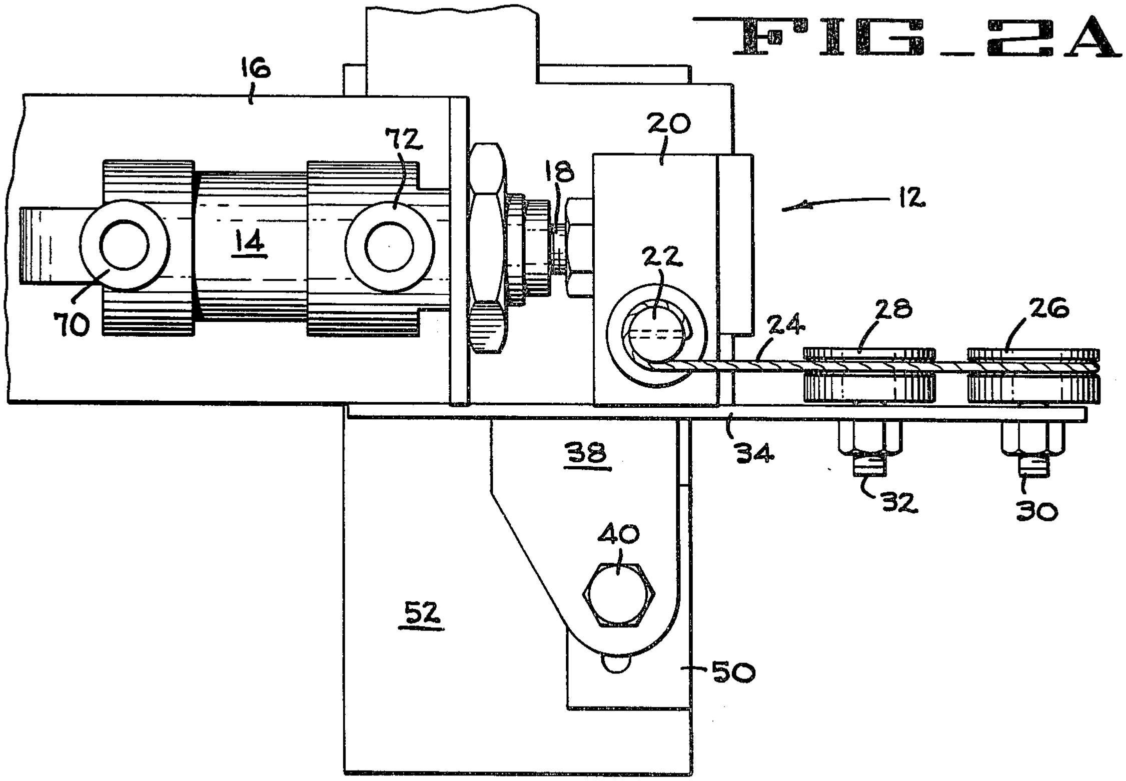
FIG. 2A is a plan as viewed in line 2A—2A of FIG. 1.
Figure 3:
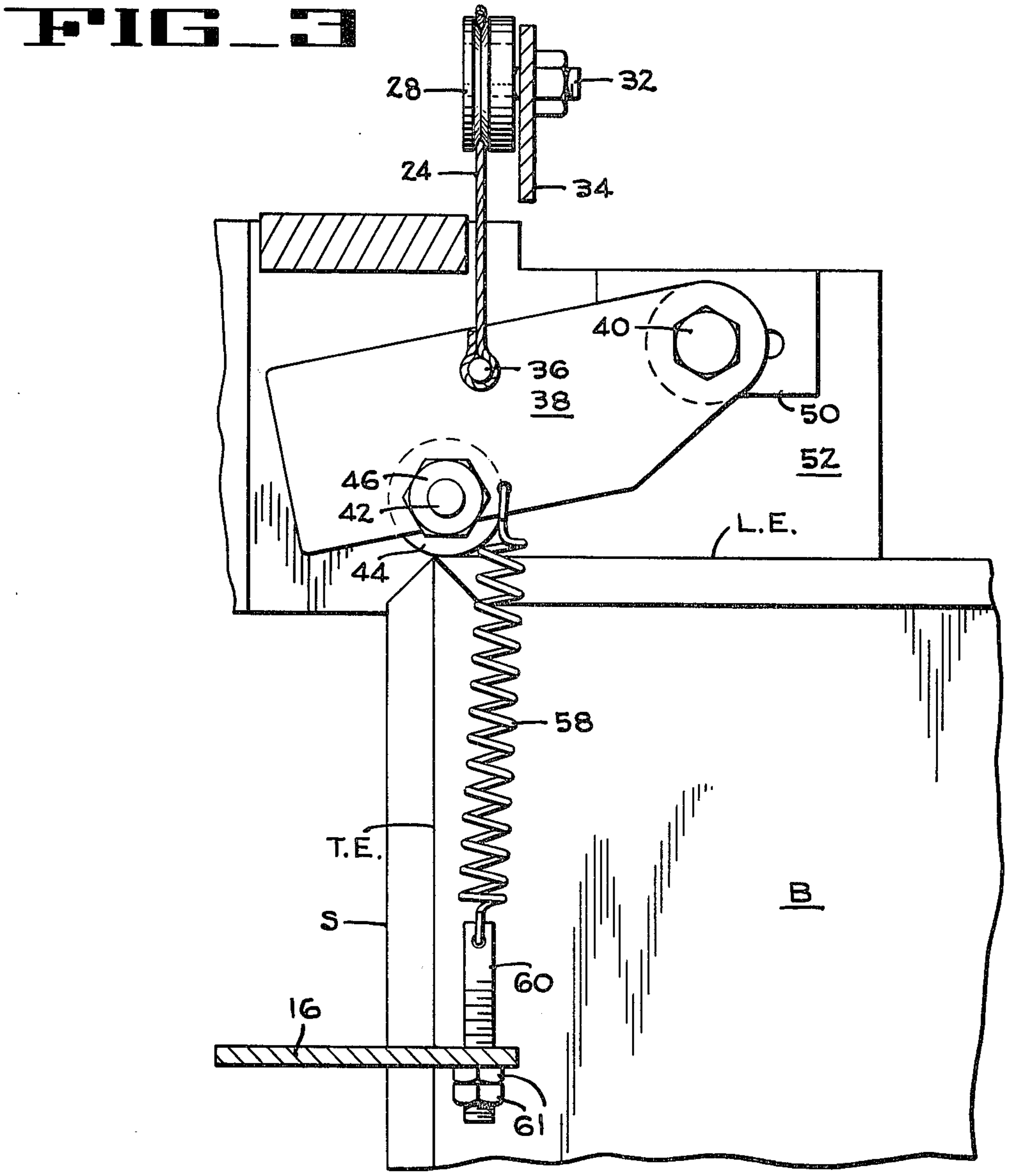
FIG. 3 is a section taken substantially along the line 3—3 of FIG. 2 showing the tucking roller in plan view.

With reference to FIGS. 1, 2 and 2A, it will be seen that the positioning means 12 comprises a double acting actuator 14 preferably operated by pressure air, fixed to a Z-shaped bracket 16. The actuator includes a projecting rod 18 which is fixed to a block 20 having attached thereto, by means of a fastener 22, a cable 24. The cable 24 is directed over idler pulleys 26 and 28 which are rotatably mounted on short stub shafts 30 and 32 fixed to a T-shaped bracket 34 which may be attached, as by welding, to the bracket 16. As shown in FIG. 3 the end of the cable 24 is wrapped around and clamped to a post 36 mounted on a lever 38 pivoted at 40.

The lever 38 rotatably mounts, on stud 42, a Teflon roller 44 which makes rolling pressure engagement with the longitudinal edges L.E. and the trailing edge T.E. of the board (FIG. 3). To insure proper tucking of the wrap or sheet S around the trailing edge of the board B, the roller 44 must be adjusted to an elevation whereby it will not wrinkle or distort the trailing flap. For this purpose the stud 42 is associated with nuts 46 located on either side of the lever 38. By manipulating the nuts 46, the elevation of the roller 44 can be adjusted to avoid distortion of the trailing flap and yet insure that the side flap is tucked tightly against the trailing edge T.E. of the board B. To insure that the lever 38 is freely pivotally movable, the pivot 40 extends through a nylon or Teflon spacer 48 and is threaded into a block 50 rigidly connected to a supporting plate 52 by screws 54. The extent to which the bolt 40 is threaded into the block 50 is limited by a set screw 56. Therefore, by adjusting the position of the set screw 56 in the threaded bore, the degree of freedom for pivotal movement of the lever 38 can be adjusted. In all events however, the bolt 40 is adjusted so that the lever 38 maintains the lower edge of the roller 44 slightly above the sheet S.

To urge the roller 44 into pressure engagement with the longitudinal edges L.E. of the board, a spring 58, having one end loop extending through a hole in the lever 38 and the other extending through a hole in a stud 60, is provided. It should be noted that the stud 60 extends through a hole in the downwardly extending leg of the bracket 16 and is provided with locknuts 61 whereby the tension of the spring 58 can be adjusted.

To render the tucking device operative when a sheet is present at the tucking station, a sheet detecting device, preferably a limit switch 62, is mounted by an L-shape support 64 to one of the brackets 16, and, as shown in FIG. 1, the limit switch is attached to the left hand bracket. The limit switch comprises a conventional roller 66 carried by a bifurcated rod 68 which when reciprocated opens and closes the limit switch. While not shown and considered to be conventional, the limit switch is connected to an electrical circuit which may include a relay for energizing a solenoid operated valve for controlling operation of the actuator 14. The actuator comprises the conventional ports 70 and 72, respectively, the head end and rod end, to which are connected conduits from a source of air under pressure. As usual the rod 18 is projected when fluid is admitted to the head end through port 70 and simultaneously exhausted from the rod end through port 72. Extending the rod 18 pays-out the cable 24 allowing the tension of the spring 58 to pivot the lever 38 toward the edge L.E. of the board until the roller 44 comes in engagement therewith. As the trailing edge of the board passes the roller, the roller is forced around the rear corner of the board in order to tuck the sheet against the trailing edge T.E.

The above sequence of events occurs when the limit switch 62 is actuated by the board but when the board moves out of contact of the limit switch 62 the actuator 14 is operated to retract the rod 18 and retract the lever 38 to the position shown in FIG. 2A.

Accordingly, the tucking rollers 44 maintain firm pressure engagement with the board edges to neatly tuck the wrap around the rear corner. As a result a neat appearing corner is produced.

Although the best mode contemplated for carrying out the present invention has been herein shown and described, it will be apparent that modification and variation may be made without departing from what is regarded to be the subject matter of the invention.

We claim:

1. In a wrapping apparatus for adhesively combining and laminating a thin sheet to one face, the opposed edges and partially to the opposed face of a generally rectangular relatively thick sheet, the thin sheet having its corners cut along a line defining an angle of 45° with the adjacent edges so that on folding the thin sheet to the edges and the opposed face of the thick sheet the corner of the thick sheet is covered, laminating the thin sheet to the edges and the opposed face of the thick board occurring while the sheets are being transported through the wrapper:

the improvement in adhering the thin sheet to the trailing corners and partially to the trailing edge of the thick sheet comprising laterally spaced supports each having coplanar plates along which the combined sheets are transported; a freely rotatable roller carried by each support; and means, responsive to the presence of combined sheets between said spaced supports, for moving said rollers laterally inwardly in pressure engagement with the edges of the combined sheets which are parallel to the direction of movement; said rollers being located above said plates a distance at least equal to the thickness of the thin sheet so that distortion or wrinkling thereof is prevented; said rollers being operative to maintain pressure rolling engagement with the trailing corners and the trailing edge of the thick sheet so as to adhere the thin sheet to such surfaces of the thick sheet.

2. In an apparatus for tucking, to trailing corners of a rectangular thick sheet, a thin sheet which is adhesively laminated to one surface, three edges and marginal portions of the other surface of the thick sheet, the thin sheet being applied to the thick sheet while said sheets are being conveyed along a rectilinear path, the thin sheet being formed with its corners cut along a line defining an angle of 45° to the edges defining the corners in order to produce a mitered joint on the other surface of the thick sheet, the improvement in said tucking apparatus comprising laterally aligned supports, each of said supports including coplanar sheet-supporting surfaces and a lever having one end pivotally mounted to said support for pivotal movement in a plane parallel to the conveying path of the sheets, a roller freely mounted on a shaft adjustably secured on the other end of each of said lever, said shafts being oriented normal to the conveying path of said sheets and being adjustable to locate the lower surface of said rollers slightly above the surface of the thin sheet, means operable in response to the leading edge of successively conveyed sheets, for concurrently moving said opposed rollers in pressure engagement with edges of the laminated sheets that are parallel to the direction being conveyed, said rollers establishing initial engagement with said parallel edges just prior to the location of the trailing transverse edge to a line intersecting the axis of rotation of said rollers, said rollers by virtue of being moved toward each other are translated inwardly along the trailing transverse edge of the thick sheet so that trailing tab portions of the thin sheet are firmly pressed and attached to the trailing corners and the transverse edge of the thick sheet.

3. The apparatus according to claim 2, wherein said means for concurrently moving said opposed roller comprises linear actuators mounted on each of said supports, and means connecting said actuators to each of said lever.

* * * * *